United States Patent
Dittmer et al.

(10) Patent No.: US 7,028,961 B1
(45) Date of Patent: Apr. 18, 2006

(54) SELF-BALANCING ADJUSTABLE FLAT PANEL MOUNTING SYSTEM

(75) Inventors: Jay Dittmer, Prior Lake, MN (US); Derek L. Derks, Shakopee, MN (US)

(73) Assignee: Csav, Inc., Wellesley, MA (US)

( * ) Notice: Subject to any disclaimer, the term of this patent is extended or adjusted under 35 U.S.C. 154(b) by 0 days.

(21) Appl. No.: 10/449,834

(22) Filed: May 30, 2003

(51) Int. Cl.
*E04G 3/00* (2006.01)

(52) U.S. Cl. .............................. 248/278.1; 248/282.1; 248/288.31; 248/921; 403/22

(58) Field of Classification Search ............. 248/278.1, 248/282.1, 349.1, 921, 923, 288.31, 917, 248/919, 922, 276.1; 403/22; 361/681; 439/162

See application file for complete search history.

(56) References Cited

U.S. PATENT DOCUMENTS

| | | | | |
|---|---|---|---|---|
| 4,483,503 A | * | 11/1984 | Gahan | 248/181.1 |
| 4,549,710 A | * | 10/1985 | Prince et al. | 248/183.3 |
| 4,554,590 A | * | 11/1985 | Chelin et al. | 348/827 |
| 4,621,782 A | * | 11/1986 | Carlson et al. | 248/183.3 |
| 4,708,312 A | * | 11/1987 | Rohr | 248/281.11 |
| 4,836,478 A | | 6/1989 | Sweere | |
| 4,836,486 A | | 6/1989 | Vossoughi et al. | |
| 4,844,387 A | | 7/1989 | Sorgi et al. | |
| 4,880,191 A | * | 11/1989 | Lake, Jr. | 248/371 |
| 4,989,813 A | * | 2/1991 | Kim et al. | 248/184.1 |
| 5,037,050 A | * | 8/1991 | Lin et al. | 248/179.1 |
| 5,102,082 A | * | 4/1992 | Bang | 248/183.2 |
| 5,209,446 A | * | 5/1993 | Kawai | 248/183.2 |
| 5,277,392 A | * | 1/1994 | Rossman et al. | 248/231.71 |
| 5,398,901 A | * | 3/1995 | Brodmann et al. | 248/288.51 |
| 5,404,182 A | * | 4/1995 | Nomura | 348/836 |
| 5,553,820 A | * | 9/1996 | Karten et al. | 248/286.1 |
| 5,603,478 A | * | 2/1997 | Wang | 248/371 |
| 5,632,463 A | * | 5/1997 | Sung et al. | 248/371 |
| 5,687,944 A | * | 11/1997 | Shon | 248/349.1 |
| 5,732,922 A | * | 3/1998 | Jeon | 248/371 |
| 5,743,503 A | | 4/1998 | Voeller et al. | |
| 5,842,672 A | | 12/1998 | Sweere et al. | |
| 5,876,008 A | | 3/1999 | Sweere et al. | |
| 5,918,841 A | | 7/1999 | Sweere et al. | |
| 5,918,845 A | | 7/1999 | Whitaker | |
| 5,923,528 A | * | 7/1999 | Lee | 361/681 |
| 5,924,665 A | | 7/1999 | Sweere et al. | |
| 5,947,429 A | | 9/1999 | Sweere et al. | |

(Continued)

*Primary Examiner*—Korie Chan
(74) *Attorney, Agent, or Firm*—Patterson, Thuente, Skaar & Christensen, P.A.

(57) ABSTRACT

A self-balanced adjustable mounting system for a flat panel display. A display interface having a hollow, semi-spherical shell portion is attached to the flat panel display. The semi-spherical shell is formed with a generally constant radius of curvature. The center of the radius of curvature is disposed proximate the center of gravity of the flat panel display with the display interface attached. The display interface is received in a guide structure that has a bearing portion engaging the outer surface of the semi-spherical shell, and a second bearing portion engaging the inner surface of the semi-spherical shell through an aperture formed in the semi-spherical shell. The semi-spherical shell is guided between the first and second bearing portions so that the flat panel display and device interface are generally rotatable about the center of the radius of curvature of the semi-spherical shell. The display is self balancing in virtually any position in the range of travel of the device due to the location of the center of rotation proximate the center of gravity.

26 Claims, 9 Drawing Sheets

U.S. PATENT DOCUMENTS

| | | |
|---|---|---|
| 5,992,809 A | 11/1999 | Sweere et al. |
| 6,000,560 A * | 12/1999 | Barkan ......................... 211/96 |
| 6,012,693 A | 1/2000 | Voeller et al. |
| 6,015,120 A | 1/2000 | Sweere et al. |
| 6,047,939 A * | 4/2000 | Kim ........................... 248/371 |
| 6,119,997 A | 9/2000 | Van Lieshout |
| 6,138,970 A * | 10/2000 | Sohrt et al. ............... 248/278.1 |
| 6,189,842 B1 * | 2/2001 | Gull et al. ................ 248/125.1 |
| 6,273,383 B1 | 8/2001 | Oddsen, Jr. |
| 6,402,109 B1 | 6/2002 | Dittmer |
| 6,409,134 B1 * | 6/2002 | Oddsen, Jr. .............. 248/274.1 |
| 6,454,234 B1 | 9/2002 | Westbrook |
| 6,478,274 B1 | 11/2002 | Oddsen, Jr. |
| 6,505,988 B1 | 1/2003 | Oddsen, Jr. |
| 6,510,049 B1 * | 1/2003 | Rosen ........................ 361/681 |
| 6,695,270 B1 * | 2/2004 | Smed ...................... 248/274.1 |
| 6,874,743 B1 * | 4/2005 | Watanabe et al. ........ 248/276.1 |
| 2003/0042385 A1 * | 3/2003 | Hung et al. ................. 248/371 |

* cited by examiner

SELF-BALANCING ADJUSTABLE FLAT PANEL MOUNTING SYSTEM

FIELD OF THE INVENTION

The present invention is directed to a self-balancing mounting system for a flat panel display that permits a single operator to tip the flat panel display to any desired angle.

BACKGROUND OF THE INVENTION

Flat panel displays have become an increasingly popular substitute for projection devices and CRT's. The flat panel display is typically mounted on a structure, such as a wall. Flat panel displays, especially LCD displays, are typically most clearly viewable from a position directly in front of the display. The display image is often too dark or not visible at all if viewed from a significant angle.

It is thus preferable that the angle of a flat panel display can be adjusted for optimum viewing. Various prior art positioning devices have been used, such as friction based hinges, mechanical linkages with springs or other biasing devices, and various mechanical latches. The friction based devices need to be sufficiently strong to hold a relatively heavy flat panel displays, while being easy to operate.

Traditional friction based devices and mechanical latches often require one person to hold the flat panel display at the correct angle, while a second person adjusts the device. Movement in the upward direction requires the operator to lift a substantial portion of the weight of the flat panel display. In some instances, the operator must also overcome the resistance of the positioning device.

Also, the hinge and pivot joints used in prior devices typically enable positioning of the display about only one axis per joint. The degree of display position adjustability of such devices is limited by the number of joints that can be economically and practically provided.

Mechanical linkages with springs are expensive to build. For example, U.S. Pat. No. 6,419,196 (Sweere et al.) discloses a multi-jointed, pivoted support arm to support and position a flat panel display that uses a nitrogen gas spring counterbalance mechanism. What is needed in the industry is a low-cost, easy to operate, and relatively maintenance free system for mounting and positioning flat panel displays that also offers a high degree of adjustability for display positioning.

BRIEF SUMMARY OF THE INVENTION

The present invention is a mounting system for a flat panel display that substantially meets the aforementioned needs of the industry. A display interface having a hollow, semi-spherical shell portion is attached to the flat panel display. The semi-spherical shell is formed with a generally constant radius of curvature. The center of the radius of curvature is disposed proximate the center of gravity of the flat panel display with the display interface attached. The display interface is received in a guide structure that has a bearing portion engaging the outer surface of the semi-spherical shell, and a second bearing portion engaging the inner surface of the semi-spherical shell through an aperture formed in the semi-spherical shell. The semi-spherical shell is guided between the first and second bearing portions so that the flat panel display and device interface are generally rotatable about the center of the radius of curvature of the semi-spherical shell.

The above described configuration enables the flat panel display to be positioned in a virtually infinite number of positions within the range of travel of the semi-spherical shell within the mount. The location of the center of rotation of the display proximate the center of gravity of the display and device interface enable self-balancing so that a virtually equal effort is required to position the display in any position, and with a relatively low effort so that positioning can be accomplished by an individual user.

In accordance with the invention, a self-balancing adjustable flat panel electronic display system adapted for mounting on a fixed structure is provided. The system includes a support structure adapted to attach to the fixed structure, and a flat panel electronic display device with a device interface portion thereon. The flat panel display device and the device interface portion together have a center of gravity. The device interface portion includes a semi-spherical portion having an outer surface with a generally constant radius of curvature with a center proximate the center of gravity. The system also includes a guide portion operably coupled to the device interface portion and the support structure. The guide portion has a first bearing portion engaging and guiding the outer surface of the semi-spherical portion and a retaining portion for retaining the device interface portion in engagement with the first bearing portion. The flat panel display and the device interface portion are rotatable about the center of the radius of curvature of the semi-spherical portion.

DETAILED DESCRIPTION OF THE INVENTION

A self-balancing adjustable mounting system 10 of the present invention is depicted in FIGS. 1–8. The system 10 generally includes a flat panel display 12, a mount 14 and a support structure 16. Support structure 16 is attachable to any fixed structure such as wall 18.

Mount 14 generally includes device interface 20 and guide structure 22. Device interface 20 generally includes a mounting plate portion 24 and a semi-spherical shell portion 26. The semi-spherical shell portion 26 has an outer surface 28, an inner surface 30 and an aperture 32 formed through the shell 26. Semi-spherical shell portion 26 has a generally constant radius of curvature 34 defined from a common center 36 over all curved portions of the shell 26.

Figure 2:
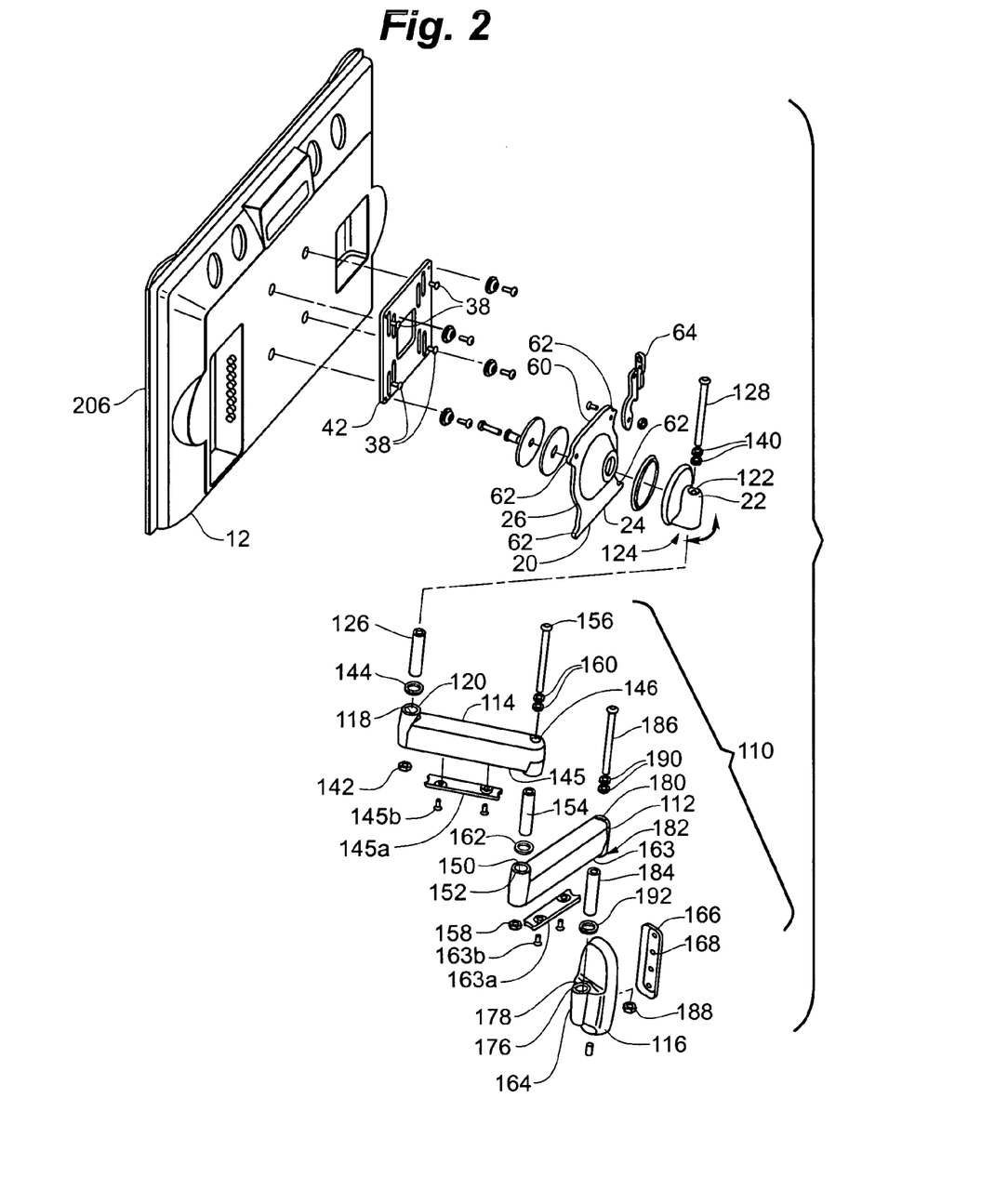
FIG. 2 is an exploded view of the display and mounting system depicted in FIG. 1.
Figure 2A:
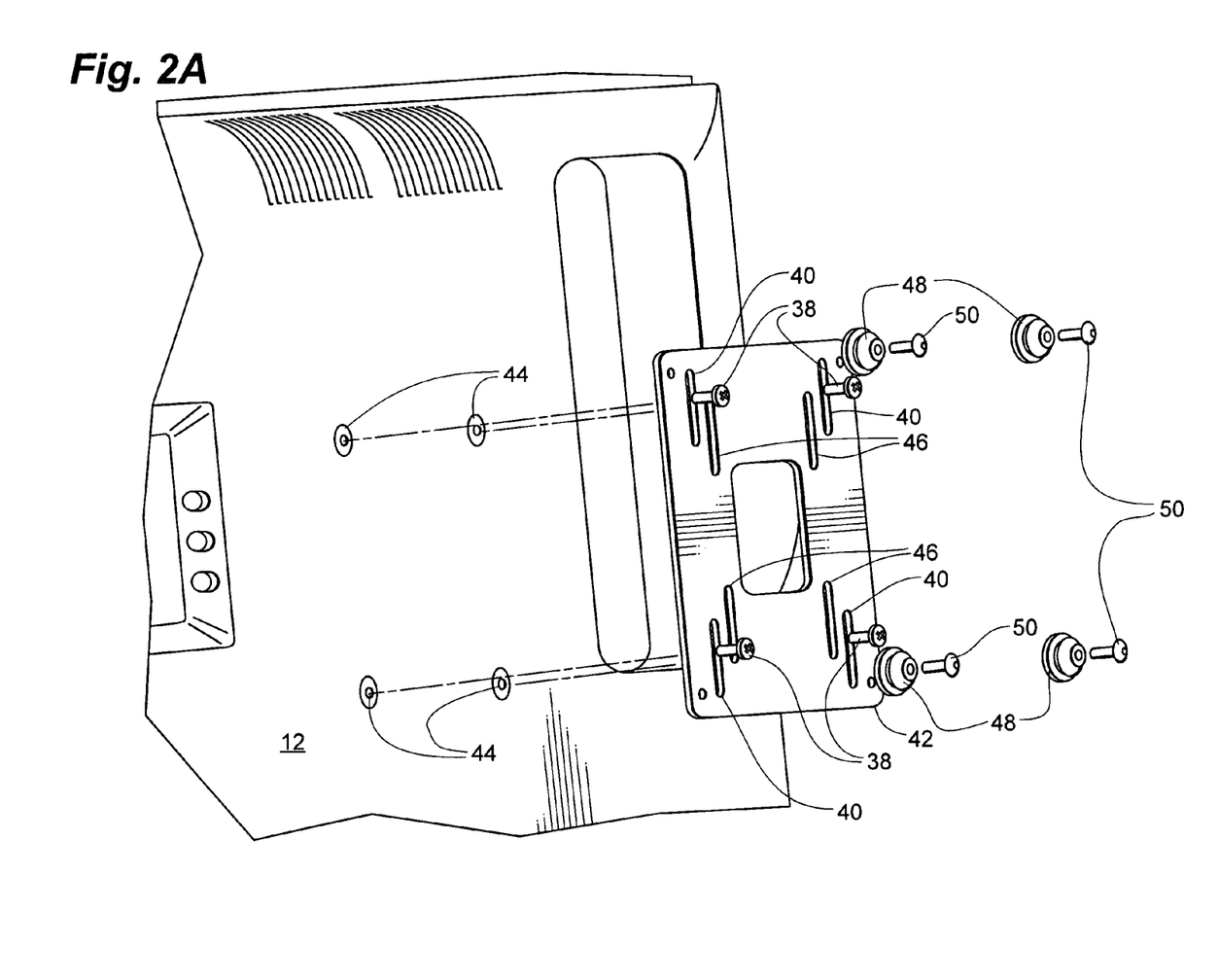
FIG. 2A is a perspective view of an adapter plate for attaching a flat panel display to the mounting system.

Mounting plate 24 is removably attachable to flat panel display 12. Threaded fasteners 38 extend through slots 40 in adapter plate 42 and thread into holes 44 in flat panel display 12. Slots 40 enable adapter plate 42 to be vertically positionable on flat panel display 12 so as to allow for positioning of center 36 near the center of gravity of the display, as will be further discussed herein below. Alternate slots 46 may be provided to enable adapter plate 42 to mate with a flat panel displays 12 of various manufacture and model, which may have an alternate positioning of holes 44.

Fastening buttons 48 are secured to adapter plate 42 with fasteners 50. Fastening buttons 48 have a head portion 52, a base portion 54, and a narrow shank portion 56, defining a slot 58. Slot 58 is dimensioned so as to receive the edge 60 of mounting plate 24. Mounting plate 24 has a plurality of notches 62 corresponding with the location of fastening buttons 48. Notches 62 are located so that mounting plate 24 may be slid into position with notches 62 engaged with shank portion 56 of each fastening button 48, and with the edges of mounting plate 24 captured between head portion 52 and base portion 54 of each fastening button 48. With mounting plate 24 in this position, latch mechanism 64 may be pivoted into position over head portion 52 of one of the fastening buttons 48, thereby securing mounting plate 24 in position. In addition to the arrangement described above, any other suitable arrangement for attaching mounting plate 24 to flat panel display 12 may be used, including fasteners directly securing mounting plate 24 to flat panel display 12.

Figure 3:
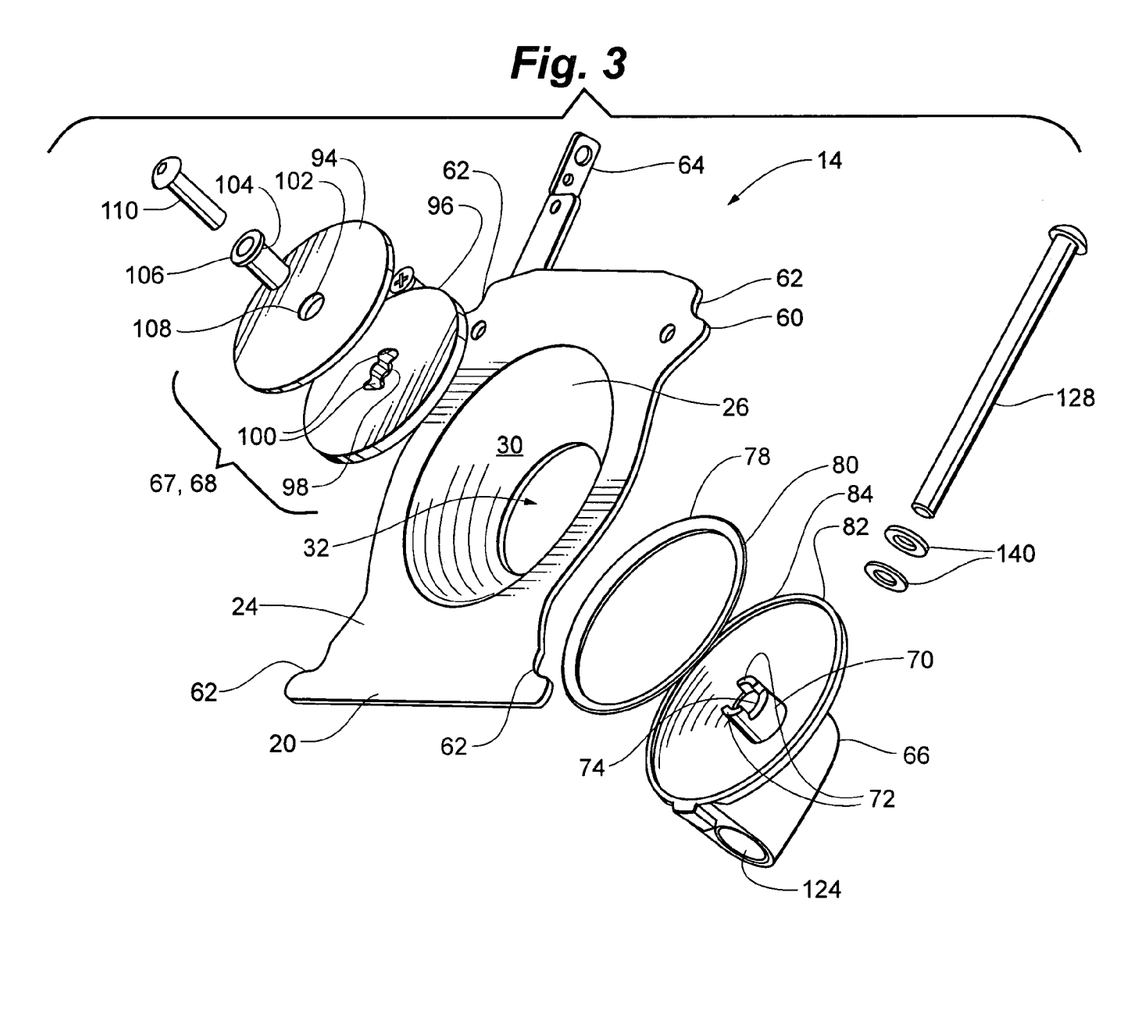
FIG. 3 is an exploded view, from an interior perspective, of the mount portion of the mounting system.
Figure 3A:
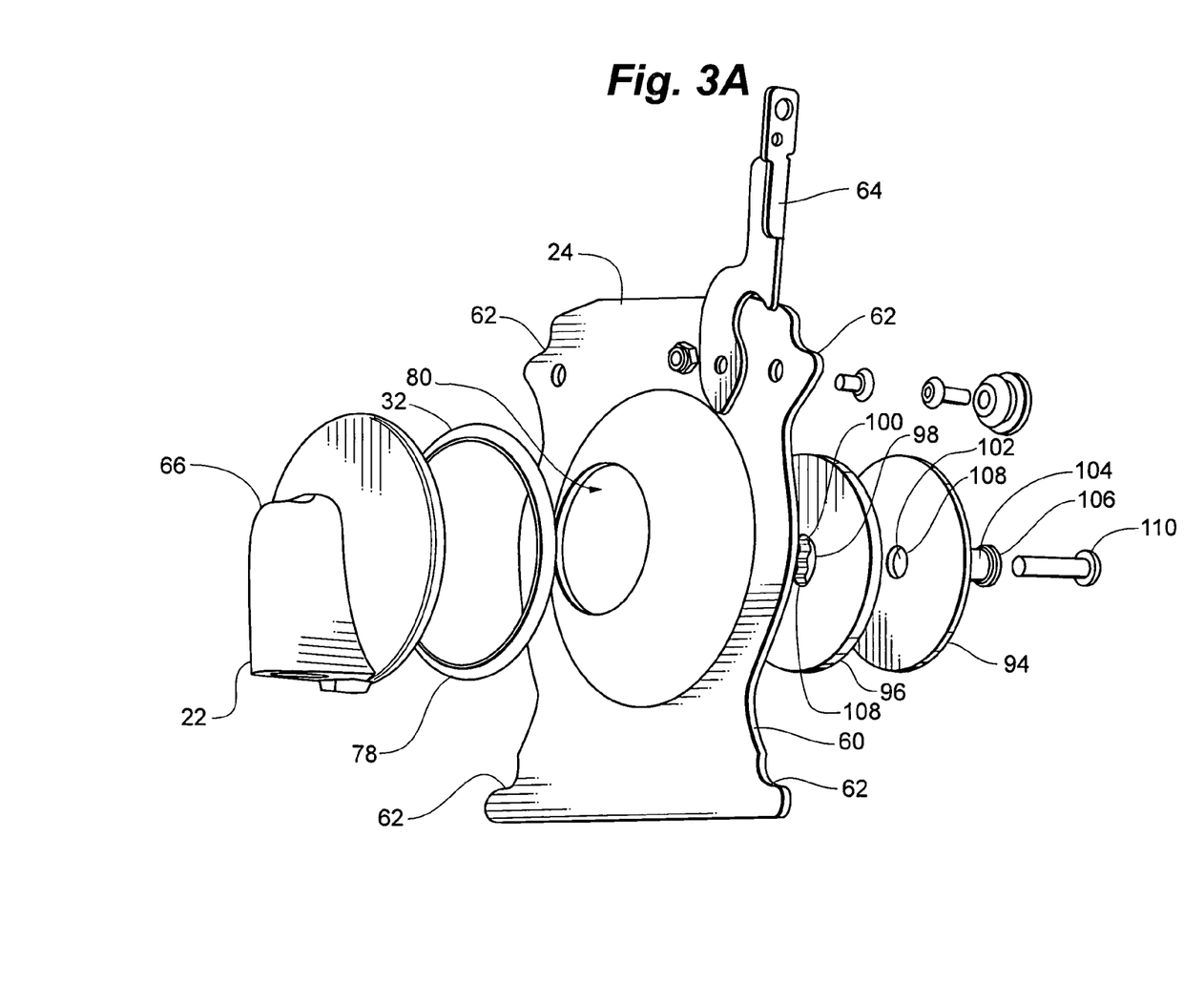
FIG. 3A is an exploded view, from an exterior perspective, of the mount portion of the mounting system.
Figure 4:
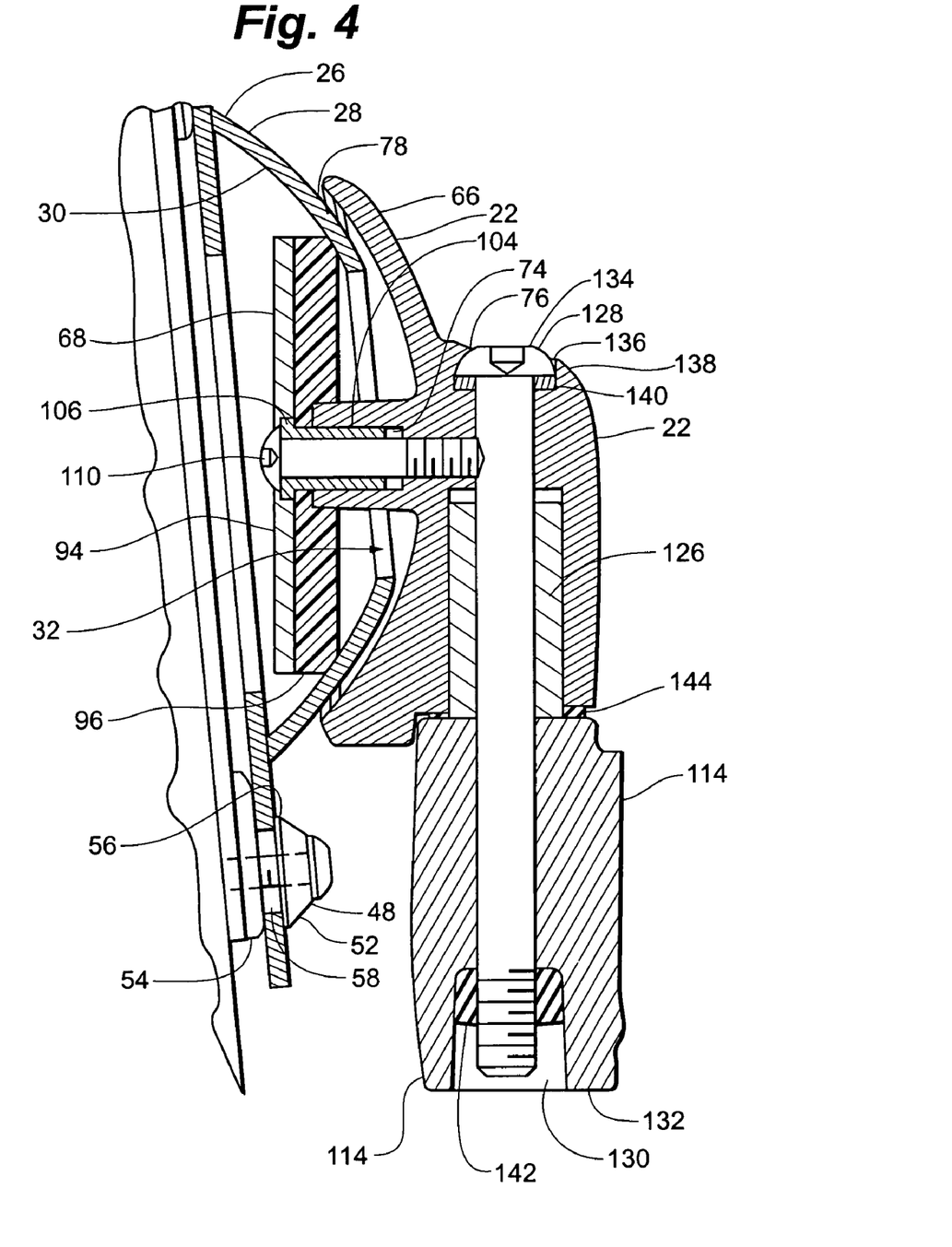
FIG. 4 is a cross-sectional view of the mount portion.
Figure 5:
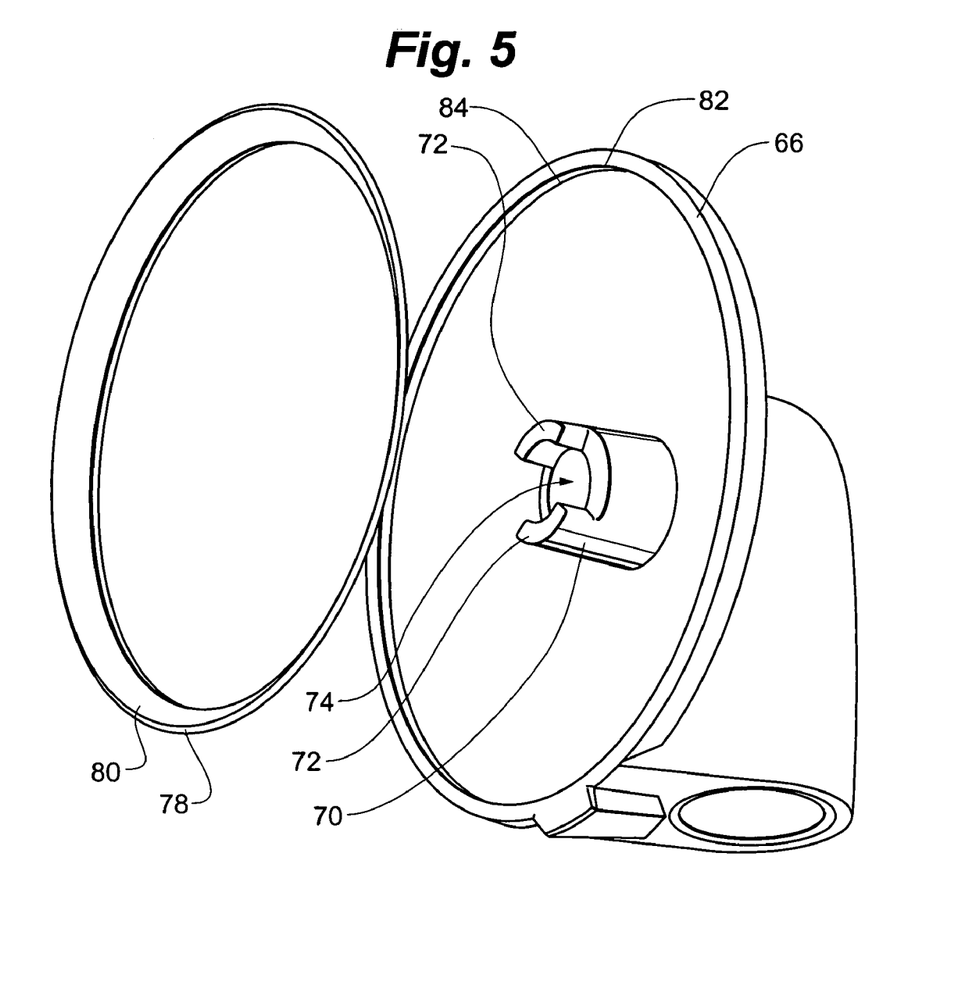
FIG. 5 is a perspective exploded view of the outer guide portion of the mount.

Guide structure 22 generally includes an outer guide portion 66 and a retaining portion 67 in the form of inner guide portion 68. Outer guide portion 66 has a boss 70 with a pair of projecting prongs 72. Boss 70 extends through aperture 32 in semi-spherical shell portion 26. Boss 70 has a bore 74 with an interior threaded portion 76. Outer guide portion 66 also has at least one bearing portion 78, which contacts the outer surface 28 of semi-spherical shell portion 26 and serves to guide rotating movement of device interface 20 and flat panel display 12. As depicted in FIGS. 3 and 5, bearing portion 78 may be a circular strip 80 fitted inside a lip 82 at the periphery 84 of outer guide portion 66. In this embodiment, bearing portion 78 is in sliding engagement with outer surface 28. Although bearing portion 78 may be made from any material having suitable friction and durability characteristics, it is presently preferred that ultra high molecular weight polyethylene (UHMWPE) be used for its superior lubricity, abrasion resistance, toughness, and freedom from stress cracking.

Figure 7:
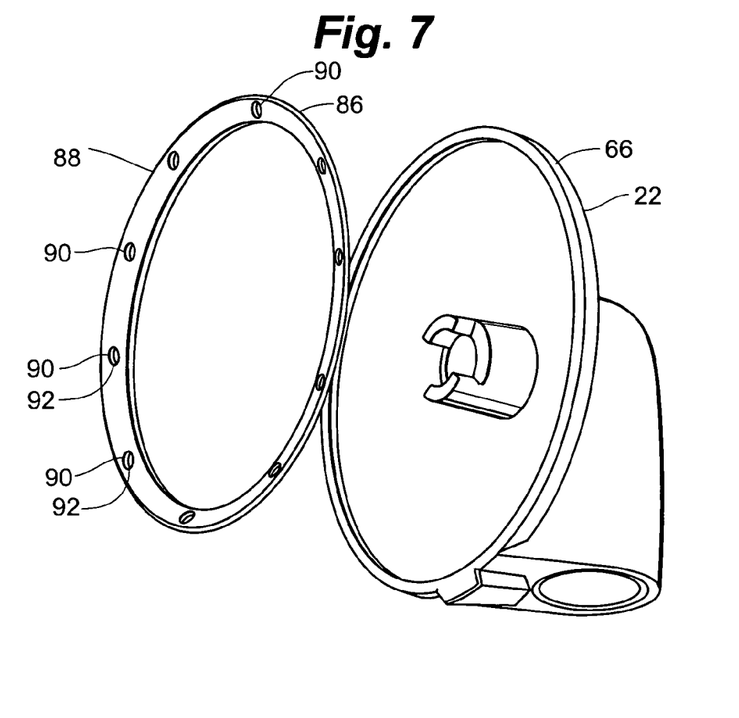
FIG. 7 is a perspective exploded view of an alternative embodiment of the outer guide portion of the mount.

As an alternative to frictional contact of bearing portion 78 with outer surface 28, a ball bearing mechanism 86 may be used in place of bearing portion 78 to provide rolling contact. As depicted in FIG. 7, ball bearing mechanism 86 generally includes a race portion 88 containing a plurality of ball bearings 90. Ball bearings 90 roll within sockets 92 in race portion 88.

Inner guide portion 68 generally includes retainer plate 94 and bearing portion 96. Bearing portion 96 has a center aperture 98 with a pair of lobes 100, which are conformingly shaped so as to receive prongs 72 of boss 70. Retainer plate 94 fits over bearing portion 96 and has a center aperture 102. Bushing 104 fits through center aperture 102 of retainer plate 94 and center aperture 98 of bearing portion 96, extending into bore 74 of boss 70. Bushing 104 has a lip 106 which engages an edge 108 of retainer plate 94. Fastener 110 extends through bushing 104 and threads into threaded portion 76 or boss 70, thereby securing inner guide portion 68 to outer guide portion 66.

Bearing portion 96 slidably engages inner surface 30 of semi-spherical shell portion 26 and serves as an additional guide for rotation of device interface 20 and the attached flat panel display 12. It is preferred that, in the depicted sliding contact embodiment, bearing portion 96 be formed from UHMWPE material for its especially desirable properties in this application. Again, it is anticipated that other suitable mechanisms, such as a ball bearing arrangement providing roller contact, could also be used in this configuration.

Figure 1:
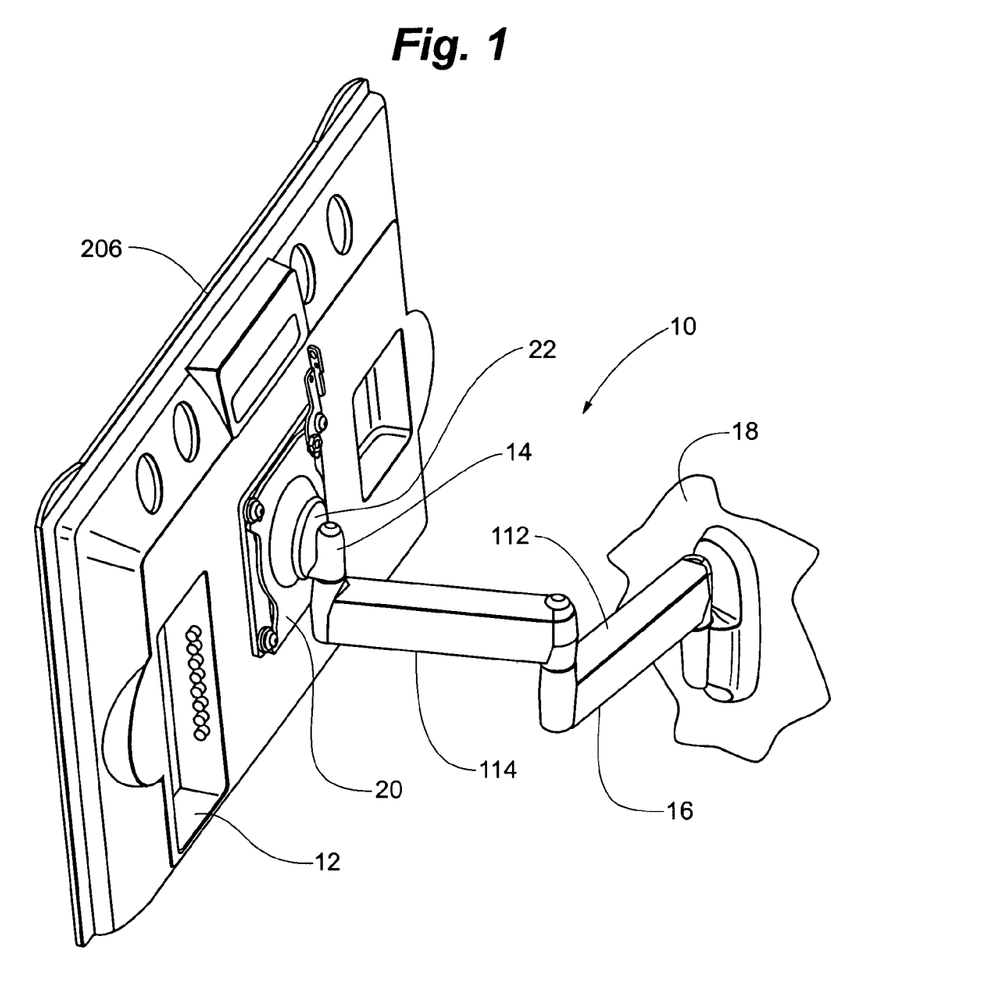
FIG. 1 is a rear perspective view of a flat panel display and mounting system of the present invention.

Mount 14 may be made so as to be attachable to any suitable support structure 16. As depicted in FIGS. 1 and 2, support structure 16 may be a swing arm assembly 110. Swing arm assembly 110 generally includes an inner arm 112, an outer arm 114 and a mounting bracket 116. Outer arm 114 has a bore 118, with an upwardly directed enlarged portion 120. Guide structure 22 has a corresponding bore 122 with a downwardly directed enlarged portion 124. Bushing 126 fits into enlarged portions 120 and 124 and is rotatable therein. Mount 14 is thus horizontally rotatably adjustable with respect to outer arm 114, as indicted by the arrows in FIG. 2.

Fastener 128 extends through bore 118, bushing 126 and bore 122, emerging in recess 130 at bottom side 132 of outer arm 114. Fastener 128 has head 134, which is received in recess 136 formed in top side 138 of guide structure 22. One or more friction washers 140 may be provided between head 134 and guide structure 22 so as to enable an adjustable amount of friction to be applied for resisting pivoting of guide structure 22 relative to outer arm 114. Nut 142 is threadably engaged with fastener 128 so as to permit application of axial pressure to friction washer 140 by tightening. Friction washer 144 may be provided between mount 14 and outer arm 114 to provide smooth rotation for the joint. Since the bottom side 145 of outer arm 114 is open, a bottom plate 145a may be affixed with fasteners 145b as depicted to enclose outer arm 114 for aesthetic purposes, and to retain any cables or wires that may be routed inside the arm.

A similar arrangement may be used to rotatably attach outer arm 114 to inner arm 112. Outer arm 114 has a bore 146 with a downwardly directed enlarged portion 148 (not depicted). Inner arm 112 has a bore 150 with an upwardly directed enlarged portion 152. Bushing 154 rotatably fits in enlarged portions 148 and 152. Fastener 156 extends through bores 146 and 150, as well as bushing 154. Fastener 156 may be secured in place with nut 158 to hold inner arm 112 and outer arm 114 together. One or more friction washers 160, 162, may be provided as before. Again, since the bottom side 163 of inner arm 112 is open, a bottom plate 163a may be affixed with fasteners 163b as depicted to enclose outer arm 112 for aesthetic purposes, and to retain any cables or wires that may be routed inside the arm.

Figure 8:
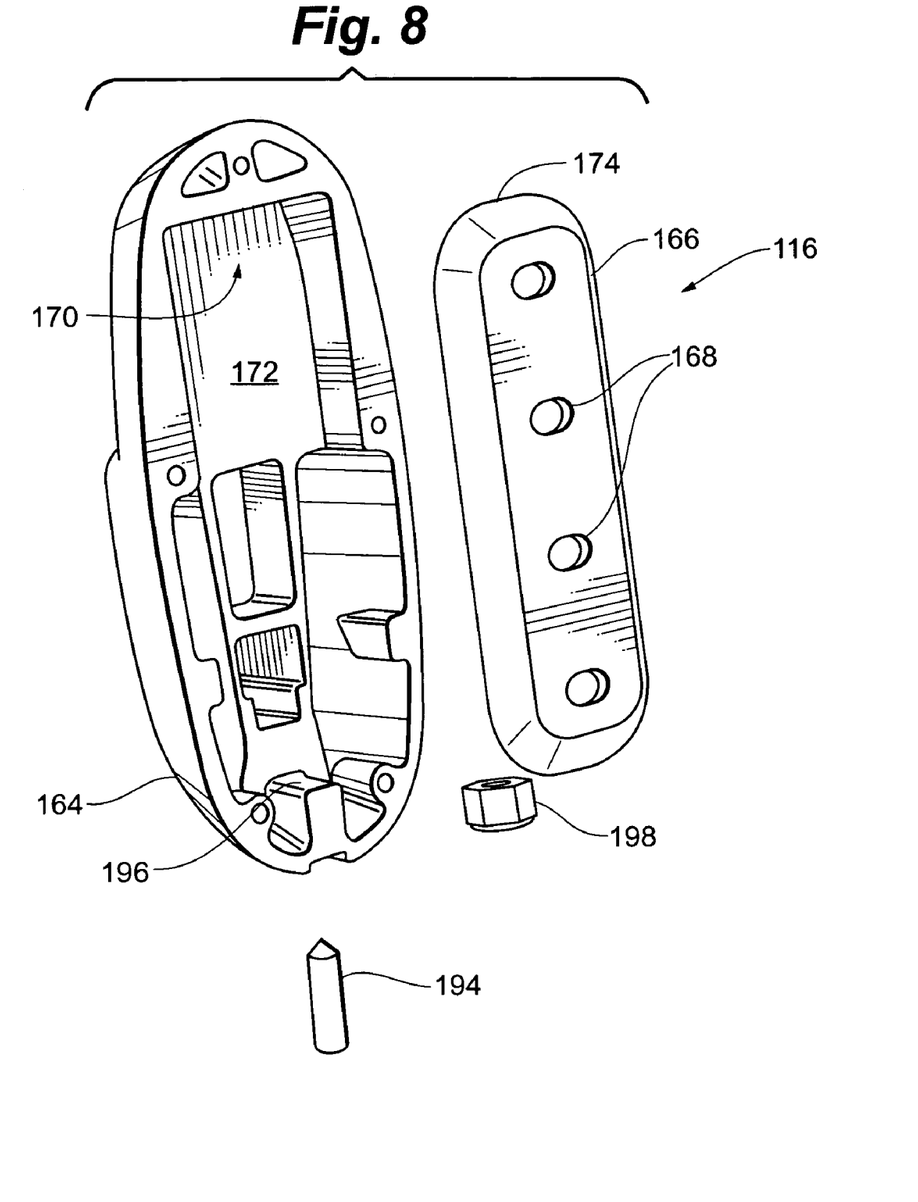
FIG. 8 is an exploded view of the mounting bracket portion of the mounting system.

Mounting bracket 116 is depicted in FIG. 8, and generally includes bracket portion 164 and hanger plate 166. Hanger plate 166 may be secured to a fixed structure, such as a wall, using fasteners inserted through apertures 168. Bracket portion 164 has a groove 170 inside housing 172 for receiving edge 174 of hanger plate 166.

A swing arm, such as inner arm 112, may be secured to mounting bracket 116 with the same arrangement as described above for connecting inner arm 112 with outer arm 114. Bracket portion 164 has a bore 176 with an upwardly directed enlarged portion 178. Inner arm 112 has a bore 180 with a downwardly directed enlarged portion 182. Again, a bushing 184 rotatably fits in enlarged portions 178, 182. Fastener 186, nut 188, and friction washers 190, 192, secure the swing arm to the bracket.

Mounting bracket 116 may be secured to a fixed structure by first installing hanger plate 166 on the structure as described above. With the hanger plate 166 in place, housing 172 is placed over hanger plate 166 so as to cover it. The housing 172 is slid downward, thereby engaging edge 174 of hanger plate 166 in groove 170, and securing bracket portion 164 and hanger plate 166 together. Set screw 194, threaded through hole 196 and secured by nut 198 prevents upward sliding movement of bracket portion 164, thereby preventing disengagement of bracket portion 164 from mounting bracket 166.

Figure 6:
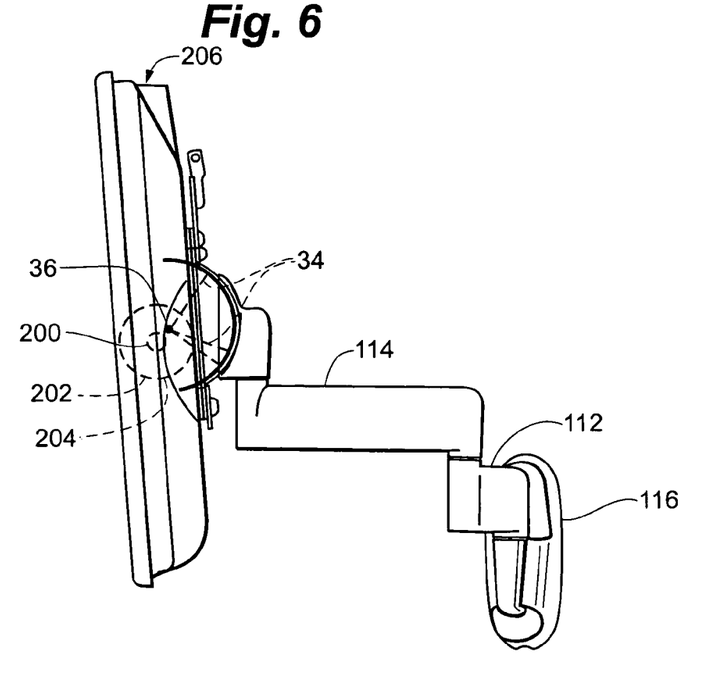
FIG. 6 is a side elevation view of a flat panel display and mount with an actual center of gravity and virtual center of gravity indicated thereon.

FIG. 6 illustrates, in exemplary fashion, a side view of a flat panel display 12 mounted to mount 14. The flat panel display 12 and the device interface 20 together have an actual center of gravity, annotated 200. As described above, semi-spherical shell portion 26 has a constant radius of curvature 34 with a common center 36. Device interface 20 is preferably positioned so that center 36 of radius of curvature 34 is located as closely as possible to the actual center of gravity 200.

Of course it will be readily appreciated that the location of actual center of gravity 200 will vary depending on the weight distribution of the particular flat panel display 12 attached to the mounting system. For purposes of the invention, a virtual center of gravity 202 may be approximated by a spherical volume 204 having actual center of gravity 200 at its center.

The operation of the invention may now be understood with reference to FIGS. 1–8. As described above, semi-spherical shell portion 26 is captured between an outer guide portion 66 and an inner guide portion 68 of guide structure 22. These guide portions 66, 68, have respective bearing portions 78, 96, that engage surfaces 28, 30, of semi-spherical shell 26. Semi-spherical shell 26 is movable between outer guide portion 66 and inner guide portion 68, guided by bearing portions 78, 96.

To adjust the position of flat panel display 12, a user may push or pull any portion of the periphery 206 of the flat panel display 12. The applied force causes flat panel display 12 and device interface 20 to rotate about center 36, as semi-spherical shell 26 passes between bearing portions 78, 96. The location of center 36 within virtual center of gravity 202, proximate actual center of gravity 200, enables flat panel display 12 to be self-balancing, thus requiring no greater amount of effort for positioning in any particular direction. This configuration enables rotational movement in any direction within the range of travel of semi-spherical shell 26 within guide structure 22, thus enabling flat panel display 12 to be positioned in a virtually infinite number of orientations.

What is claimed is:

1. A self-balancing adjustable flat panel electronic display system adapted for mounting on a non-horizontal fixed structure, the system comprising:
   a support structure adapted to attach to the fixed structure;
   a flat panel electronic display device;
   a device interface portion for receiving the flat panel electronic display device thereon, said flat panel display device and said device interface portion together having a center of gravity, said device interface portion including a frusto-spherical portion having an outer surface with a generally constant radius of curvature and a flange portion extending radially outwardly from the frusto-spherical portion, the flange portion having structure defining at least one aperture for receiving a fastener to couple the device interface portion with the flat panel electronic display device, the frusto-spherical portion having structure defining an aperture and presenting an aperture periphery, the said radius of curvature defining a center proximate said center of gravity, the weight of the flat panel electronic display device and the device interface portion acting through the center of gravity exerting a moment force on the support structure; and
   a guide structure operably coupling said device interface portion and the support structure, said guide structure having a first bearing portion engaging and guiding the outer surface of said frusto-spherical portion and a retaining portion for retaining said device interface portion in engagement with said first bearing portion, said guide structure including a portion extending through the aperture in the device interface portion, the portion of the guide structure extending through the aperture in the frusto-spherical portion having an outer surface spaced apart from the aperture periphery in all radial directions when the device interface portion is positioned so that the portion of the guide structure extending through the aperture in the frusto-spherical portion is at the center of the aperture in the frusto-spherical portion, wherein the flat panel electronic display device and device interface portion are selectively rotatably positionable about the center of the radius of curvature of said frusto-spherical portion in all rotational directions with substantially equal effort.

2. The display system of claim 1, wherein said first bearing portion slidably engages said outer surface of said frusto-spherical portion.

3. The display system of claim 2, wherein said first bearing portion is formed from ultra high molecular weight polyethylene.

4. The display system of claim 1, wherein said first bearing portion rollingly engages said outer surface of said frusto-spherical portion.

5. The display system of claim 1, wherein said frusto-spherical portion comprises a hollow shell having an inner surface, said guide structure further comprising a second bearing portion engaging and guiding said inner surface.

6. The display system of claim 5, wherein said second bearing portion slidably engages said inner surface of said frusto-spherical portion.

7. The display system of claim 6, wherein said second bearing portion is formed from ultra high molecular weight polyethylene.

8. The display system of claim 5, wherein said second bearing portion rollingly engages said inner surface of said frusto-spherical portion.

9. The combination of a flat panel electronic display device and a self-balancing adjustable mounting system adapted to receive the flat panel electronic display device thereon such that, when the flat panel display device is attached to the mounting system a center of gravity is established, the mounting system comprising:
   a support structure adapted to attach to a non-horizontal fixed structure;
   a device interface including a frusto-spherical portion having a generally constant radius of curvature with a center and a flange portion extending radially outwardly from the frusto-spherical portion for receiving the flat panel electronic display device thereon, the flange portion having structure defining at least one aperture for receiving a fastener to couple the device interface portion with the flat panel electronic display device, the device interface adapted to receive the flat panel display device so that a common center of gravity for the flat panel display device and the device interface is established, so that the weight of the electronic display device and the device interface acting through the common center of gravity exerts a moment force on the support structure, and so that the center of the radius of curvature of the frusto-spherical portion is positioned proximate the common center of gravity, the frusto-spherical portion having structure defining an aperture and presenting an aperture periphery;

guide means for slidably engaging and guiding said frusto-spherical portion of said device interface, the guide means including structure extending through the aperture in the frusto-spherical portion, the structure extending through the aperture in the frusto-spherical portion having an outer surface spaced apart from the aperture periphery in all radial directions when the device interface is positioned so that the structure extending through the aperture in the frusto-spherical portion is at the center of the aperture in the frusto-spherical portion, said means enabling the flat panel display and device interface to be selectively rotatably positionable about the center of said radius of curvature in all rotational directions with substantially equal effort when the flat panel electronic display device is attached to the device interface;

means for retaining said device interface in contact with said guide means; and means for operably coupling said guide means with said support structure.

10. The flat panel display and mounting system of claim 9, wherein said frusto-spherical portion has an outer surface and wherein said guide means includes a guide portion with at least one bearing portion positioned to engage and guide the outer surface.

11. The flat panel display and mounting system of claim 10, wherein said bearing portion slidably engages the outer surface of said frusto-spherical portion.

12. The flat panel display and mounting system of claim 11, wherein said bearing portion is formed from ultra high molecular weight polyethylene.

13. The flat panel display and mounting system of claim 10, wherein said bearing portion rollingly engages the outer surface of said frusto-spherical portion.

14. The flat panel display and mounting system of claim 10, wherein said frusto-spherical portion comprises a hollow shell having an inner surface, said guide portion further comprising a second bearing portion engaging and guiding said inner surface.

15. The flat panel display and mounting system of claim 14, wherein said second bearing portion slidably engages the inner surface of said frusto-spherical portion.

16. The flat panel display and mounting system of claim 15, wherein said second bearing portion is formed from ultra high molecular weight polyethylene.

17. The flat panel display and mounting system of claim 14, wherein said second bearing portion rollingly engages the inner surface of said frusto-spherical portion.

18. The combination of a flat panel electronic display device and a self-balancing adjustable mounting system, the flat panel electronic display device having a front side presenting an electronic display and an opposing back side, the system adapted to receive and support the flat panel electronic display device so that the front side of the flat panel electronic display device is positioned in a generally vertical orientation, the mounting system comprising:

a support structure adapted to attach to a non-horizontal fixed structure;

a device interface having a frusto-spherical shell portion and a flange portion extending radially outwardly therefrom, the flange portion having structure defining at least one aperture for receiving a fastener to attach the device interface to the back side of the flat panel electronic display device so that the frusto-spherical shell portion projects outward from the back side of the flat panel electronic display device and so that the device interface and the flat panel electronic display device together establish a center of gravity, said frusto-spherical shell portion having a generally constant radius of curvature, said radius of curvature having a center proximate the center of gravity, said shell portion further having an inner surface, an outer surface, and an aperture formed therethrough presenting an aperture periphery; and a guide structure operably coupled to the support structure, said guide structure including at least one outer guide portion engaging the outer surface of the shell portion, and at least one inner guide portion engaging the inner surface of the shell portion, said inner and outer guide portions being connected by an intermediate portion extending through said aperture in the frusto-spherical shell portion, the intermediate portion presenting an outer surface, the outer surface of the intermediate portion spaced apart from the aperture periphery in all radial directions when the intermediate structure is positioned at the center of the aperture in the frusto-spherical shell portion, wherein when the flat panel electronic display device is attached to the device interface, the device interface and the flat panel electronic display device are selectively rotatably positionable about the center of the radius of curvature of the shell portion in all rotational directions with substantially equal effort.

19. The flat panel display and mounting system of claim 18, wherein said wherein said outer guide portion has a first bearing surface in slidable engagement with said outer surface of said frusto-spherical portion.

20. The flat panel display and mounting system of claim 19, wherein said first bearing surface is formed from ultra high molecular weight polyethylene.

21. The mounting system of claim 18, wherein said outer guide portion has a ball portion in rolling engagement with said outer surface of said frusto-spherical portion.

22. The flat panel display and mounting system of claim 18, wherein said second bearing portion slidably engages said inner surface of said frusto-spherical portion.

23. The flat panel display and mounting system of claim 22, wherein said second bearing portion is formed from ultra high molecular weight polyethylene.

24. The flat panel display and mounting system of claim 18, wherein said second bearing portion has a ball portion in rolling engagement with said inner surface of said frusto-spherical portion.

25. The combination of a flat panel electronic display device and a mounting system for adjustably mounting the flat panel electronic display device on a non-horizontal surface of a fixed structure, the system comprising:

a support structure adapted to attach to the non-horizontal surface of the fixed structure;

a guide portion operably coupled with the support structure; and a device interface operably coupled with the guide portion, the device interface having a frusto-spherical shell portion with a radius of curvature having a center and a flange portion extending radially outwardly from the frusto-spherical shell portion for receiving the flat panel electronic display device thereon, the flange portion having structure defining at least one aperture for receiving a fastener to couple the device interface with the flat panel electronic display device, the frusto-spherical shell portion being coupled with the guide portion so that the device interface is rotatably positionable about the center of the radius of curvature of the frusto-spherical shell portion, the device interface adapted to be coupled with the flat panel electronic display device so that a common center of gravity for the flat panel electronic display device and the device interface is established, so that the weight of the flat panel electronic display device and the device interface acting through the common center of gravity exerts a moment force on the support structure, and so that the center of the radius of curvature of the frusto-spherical shell portion is positioned proximate the common center of gravity, wherein the flat panel electronic display device is selectively rotatably tiltably positionable about the center of the radius of curvature of the frusto-spherical shell portion in all rotational directions with substantially equal effort.

26. A self-balancing adjustable flat panel electronic display system adapted for mounting on a non-horizontal fixed structure, the system comprising:

a support structure adapted to attach to the fixed structure;

a flat panel electronic display device;

a device interface portion for receiving the flat panel electronic display device thereon, said flat panel display device having a center of gravity, said device interface portion including a frusto-spherical portion having an outer surface with a generally constant radius of curvature and a flange portion extending radially outwardly from the frusto-spherical portion, the flange portion having structure defining at least one aperture for receiving a fastener to couple the device interface portion with the flat panel electronic display device, the radius of curvature of the frusto-spherical portion defining a center proximate the center of gravity of the flat panel display device; and a guide structure operably coupling said device interface portion and the support structure, said guide structure having a first bearing portion engaging and guiding the outer surface of said frusto-spherical portion and a retaining portion for retaining said device interface portion in engagement with said first bearing portion, wherein the flat panel electronic display device is selectively rotatably positionable in roll, pitch, and yaw, about the center of the radius of curvature of the frusto-spherical portion with substantially equal effort.

* * * * *

UNITED STATES PATENT AND TRADEMARK OFFICE
CERTIFICATE OF CORRECTION

| | | |
|---|---|---|
| PATENT NO. | : 7,028,961 B1 | Page 1 of 1 |
| APPLICATION NO. | : 10/449834 | |
| DATED | : April 18, 2006 | |
| INVENTOR(S) | : Dittmer et al. | |

It is certified that error appears in the above-identified patent and that said Letters Patent is hereby corrected as shown below:

Field (73):

Delete "Csav" and insert --CSAV--.

Column 1, Line 25:

Delete "displays" and insert --display--.

Column 3, Line 9:

Delete "displays" and insert --display--.

Signed and Sealed this

Tenth Day of July, 2007

JON W. DUDAS
*Director of the United States Patent and Trademark Office*